Figure 1:
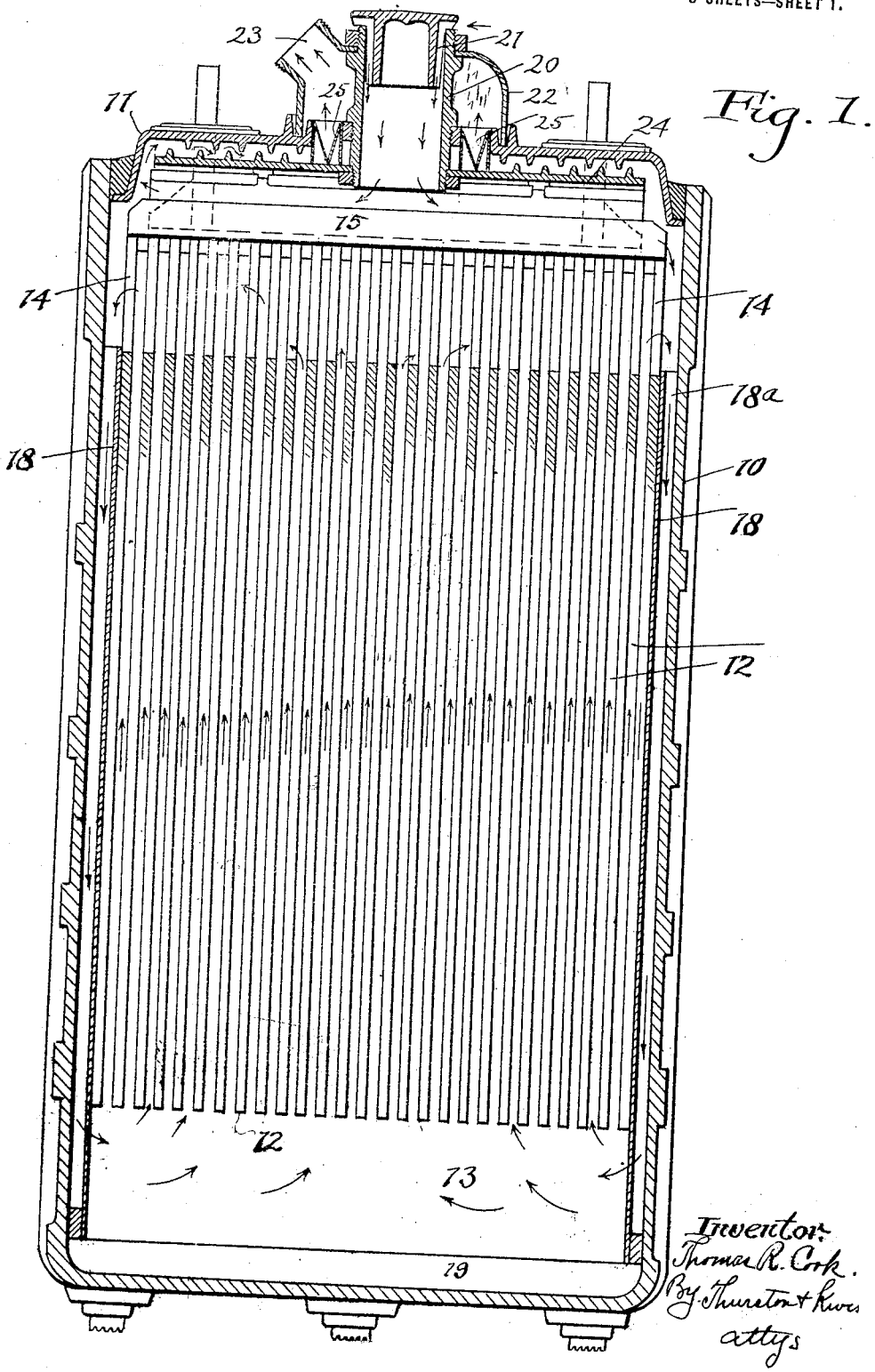

UNITED STATES PATENT OFFICE.

THOMAS R. COOK, OF EAST CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

1,376,257.   Specification of Letters Patent.   Patented Apr. 26, 1921.

Application filed May 11, 1918. Serial No. 233,836.

*To all whom it may concern:*

Be it known that I, THOMAS R. COOK, a citizen of the United States, residing at East Cleveland, in the county of Cuyahoga and State of Ohio, have invented a certain new and useful Improvement in Storage Batteries, of which the following is a full, clear, and exact description.

This invention relates to improvements in storage batteries, and has particular reference to batteries of large size, such as are used in submarines.

It is well known that when a battery is on charge, chemical action produces heat which is transmitted to the electrolyte between the plates, giving it a tendency to rise, and gas is liberated from the plates in the form of bubbles which pass upwardly and tend to cause an upward movement of the electrolyte, but in storage batteries generally, and particularly in submarine batteries, the plates are packed very tightly in the jar, and the only connecting space between the electrolyte below the plates and that above the plates is the space existing between the plates, or between the separators and the plates. There being no means provided for a downward flow of electrolyte, there can be no material upward flow of electrolyte between the plates, in consequence of which eddy currents are set up between the plates, causing a very sluggish circulation, and resulting in very little heat being brought to the top of the cell except such as is transmitted by conduction.

It is customary to ventilate submarine batteries for the double purpose of carrying away the gases which are liberated, and also to produce a cooling action on the electrolyte, and inasmuch as there is very little circulation of the electrolyte for the reason above explained, there is very little cooling effect produced by the air currents which are commonly caused to pass through the upper portions of the cells above the electrolyte.

It has been proposed to cool the batteries by forcing outside air into the bottom of the cell, it being thought that the rising air bubbles would cause the desired circulation of electrolyte. This latter mode of cooling has not, however, been entirely satisfactory.

The present invention is foreign to that just referred to, but contemplates the provision of means whereby there will be a natural but well defined continuous circulation of the electrolyte. This result is accomplished by the provision of proper spaces for the downward flow of the electrolyte from the top to the bottom of the cell, thereby permitting a free upward flow between the plates.

The feature above explained is of considerable value as a cooling means, even though employed independently of a cooling agency such as air currents passed through the top of the cell, but is especially useful when employed with the latter.

The invention may be further briefly summarized as consisting in certain novel details of construction and combinations and arrangements of parts which will be described in the specification and set forth in the appended claims.

Figure 2:
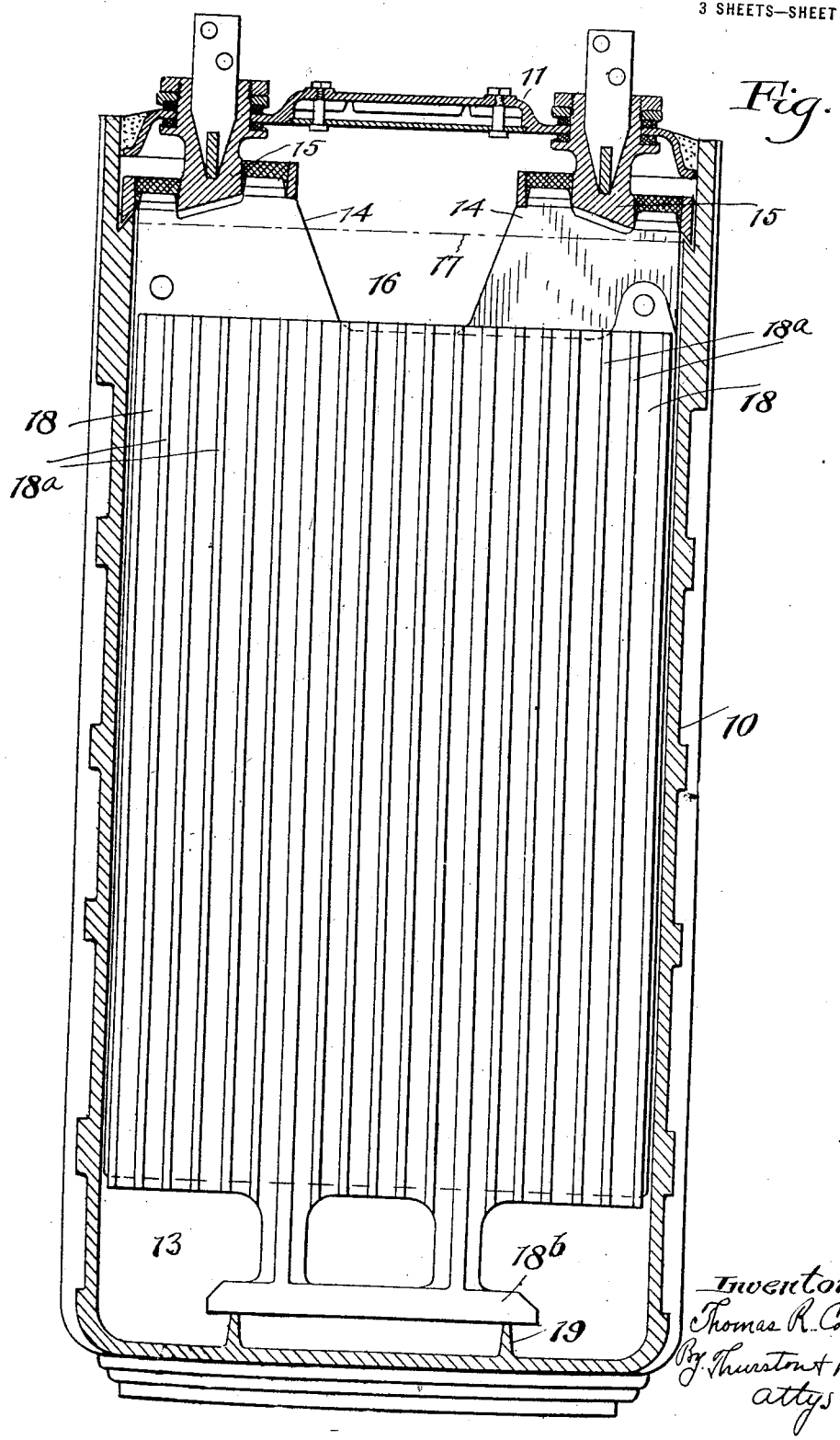
Figure 3:
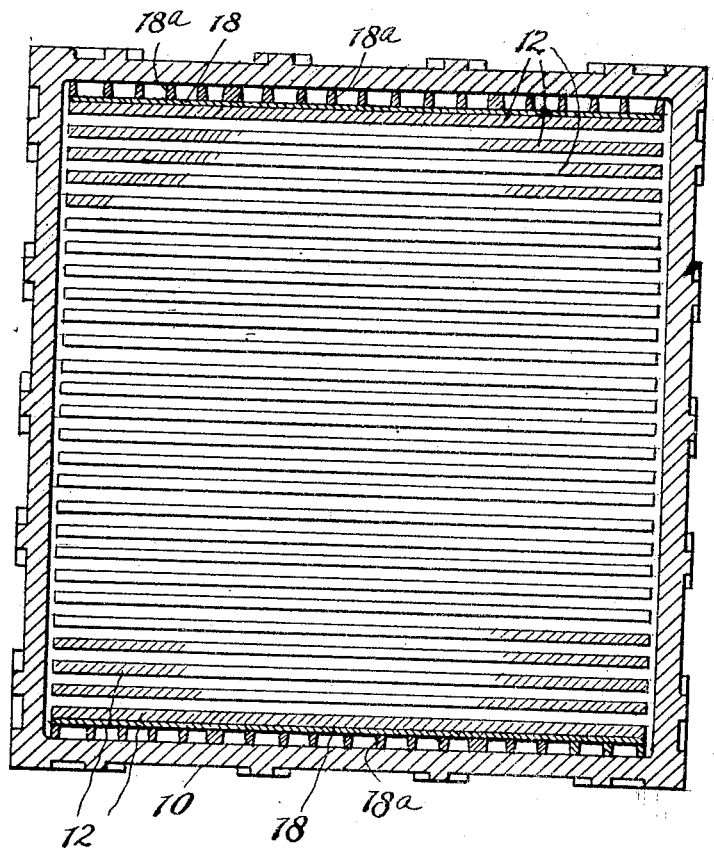

In the accompanying sheets of drawings, I have shown one embodiment of my invention which operates with high efficiency, although the details of construction and arrangement of the various parts may be other than here shown, and in this embodiment Figure 1 is a transverse sectional view looking at the edges of the plates, the separators being omitted for the sake of clearness; Fig. 2 is a sectional view at right angles to that of Fig. 1, looking at the face of one of the ribbed circulation members, one of which is preferably provided at each side of the cell just beyond the face of the outermost plate; and Fig. 3 is a horizontal sectional view.

Referring now to the drawings, 10 represents the jar or container of the cell with a specially constructed cover 11 to admit of a proper ventilation at the top of the cell. While the details of this cover form no part of the present invention but are claimed in a separate application, they will be referred to presently.

Inside the cell are the usual positive and negative plates 12, which are preferably hung from the upper part of the cell, leaving below the cell a practically unobstructed space 13. At the top the plates are provided with lugs 14, which are connected to straps 15, the lugs extending from the positive plates being at one side of the cell, and the lugs extending from the negative plates being at the opposite side, thus leaving an unobstructed space 16 between the lugs for the lateral flow of electrolyte at the top of the cell as the electrolyte rises from between the plates, the electrolyte line being indicated at 17 in Fig. 2.

To permit an unobstructed downward flow of the cooled electrolyte from the top to the bottom of the cell, I provide special passageways for the downward flow, and in this case this is accomplished by the provision of rib members 18 between the sides of the two outermost plates and the adjacent sides of the cell, these members 18 being the full width of the plates, and being provided with vertical ribs 18ª which engage the sides of the jar, the ribs being provided for strengthening purposes. Preferably reduced portions of each member 18 extend downwardly to a foot portion 18ᵇ which is below the bottom line of the plates and which rests on supporting ribs 19 projecting upwardly from the bottom of the jar.

With this construction the electrolyte may rise from between the plates and at the top of the cell above the plates pass laterally and then downward through the grooves between the ribs of the members 18ª.

As before stated, I prefer to provide in connection with the feature above explained, means for ventilating the top of the cell to carry off the gases evolved, and to cool the electrolyte as it circulates. As here shown, this is accomplished by providing in the cover 11 an air inlet and filling tube 20, normally partially closed by a plug 21, between which and the top of the tube air may be caused to pass. Surrounding the tube 21 is a dome 22 with an air outlet 23. The tube 21 and dome 22 are in a somewhat elevated central portion of the cover, and beneath the elevated part of the cover I provide a plate 24 which extends crosswise of the cover, but not entirely to the ends of the latter, leaving a space for the ingress of air. With this construction a suitable suction tube is connected to the outlet 23, and air enters the tube 20 around the plug 21, passes downwardly and sweeps in both directions in the space above the acid to the ends of the plate 24 where it passes inwardly toward the dome between the ribs on the plate and cover respectively, and then passes into the dome through perforated members 25, and out through the outlet 23. Certain features of the above cover and ventilating construction are novel with me, but these are claimed in a separate application.

It will be understood that the construction of the cover and the mode of ventilating the top of the cell may be other than here shown, this particular form being illustrated as it is very effective and may be employed with the electrolyte circulating features to cool the electrolyte as it circulates to the top of the plates and passes laterally to the vertical grooves provided for the downward or return circulation. Other features likewise may be modified, and therefore I do not wish to be confined to the precsie details shown, but aim in my claims to cover all modifications which do not involve a departure from the spirit and scope of my invention in its broadest aspects.

Having described my invention, I claim:

1. A storage battery comprising a receptacle containing positive and negative plates and an electrolyte, there being spaces at the top and bottom of the cell for the lateral flow of the electrolyte, and ribbed spacing members between the sides of the outermost plates and the adjacent sides of the receptacle forming vertical passageways for the downward flow of the electrolyte from the space at the top to the space at the bottom of the cell.

2. A storage battery comprising a receptacle containing positive and negative plates and an electrolyte, spaces being provided to permit a natural circulation of the electrolyte upwardly between the plates, laterally over the plates, and downwardly to the bottom of the receptacle beneath the plates, and means for causing a circulation of cooling air currents above the surface of the electrolyte at the top of the receptacle.

3. A storage battery comprising a receptacle containing positive and negative plates and an electrolyte, spaces being provided for a natural circulation of electrolyte upwardly between the plates, laterally over the plates, and downwardly between the outermost plates and the adjacent sides of the receptacle to the lower portion of the receptacle below the plates, and means for causing a forced circulation of cooling air currents through the upper portion of the receptacle over the surface of the electrolyte.

4. The method of cooling the electrolyte and of disposing of the evolved gases in a storage battery, which comprises providing spaces for a natural circulation of the electrolyte downwardly to the bottom of the cell and upwardly between the plates, and causing a forced circulation of air over the electrolyte.

5. The method of cooling the electrolyte in the cell of a storage battery and carrying away the gases evolved therein, which comprises providing spaces for an upward circulation of electrolyte between the plates, and a downward circulation between the outermost plates and the sides of the cell, and causing a forced circulation of air over the electrolyte.

6. The method of cooling the electrolyte in the cell of a storage battery which comprises providing spaces for a natural circulation of electrolyte upwardly between the plates, laterally over the plates, and downwardly between the plates and the sides of the cell, and causing a forced circulation of air over the electrolyte.

7. The method of cooling the electrolyte in the cell of a storage battery which comprises providing spaces for a natural circulation of electrolyte upwardly between the plates, laterally over the plates, and downwardly between the plates and sides of the cell, and introducing air into the top of the cell and causing it to pass laterally over the electrolyte.

8. The method of cooling the electrolyte in the cell of a storage battery which comprises providing spaces for a natural circulation of electrolyte upwardly between the plates, laterally over the plates, and downwardly between the plates and the sides of the cell, and causing a forced circulation of air by introducing it through the cover near the center thereof and causing it to pass over the electrolyte laterally toward the sides of the cell and out from the cell.

9. The method of cooling the electrolyte in the cell of a storage battery which comprises providing spaces for a natural circulation of electrolyte upwardly between the plates, laterally over the plates toward opposite sides of the cell, and downwardly between the outermost plates and the sides of the cell, introducing air in the top of the cell near the center and causing it to flow over the electrolyte laterally toward opposite sides of the cell in the same directions that the electrolyte is flowing.

In testimony whereof I hereunto affix my signature.

THOMAS R. COOK.